United States Patent Office 3,285,748
Patented Nov. 15, 1966

3,285,748

PROCESS OF PREPARING AND FEEDING A FEED CONTAINING *B. THURINGIENSIS*

Carl H. Koonz, Downers Grove, and Richard A. Greenberg, Chicago, Ill., assignors to Swift & Company, Chicago, Ill., a corporation of Illinois No Drawing. Filed Dec. 1, 1960, Ser. No. 72,847
The portion of the term of the patent subsequent to Sept. 22, 1981, has been disclaimed
3 Claims. (Cl. 99—2)

This invention relates to animal feeds and more particularly to a method for imparting pesticidal properties to animal feeds. Important advantages are obtained by the method for preparing insect-resistant animal feeds and also the method for rendering area frequented by animals resistant to insect infestation.

Many animal feeds, such as cattle rations, poultry feed, swine feeds, and pet foods, are subject to infestation by insects. Grain, fodder, mixes, meals, and other vegetable-based dry animal feeds can become infested with moths, borers, and other insects which cause considerable damage to the feed and resultant expense to formers and feed producers. Also, the problems presented by insects, particularly house flies, in areas frequented by animals are very familiar to farmers, poultry raisers, cattle men, etc. House flies in barns, barnyards, poultry raising areas, kennels, etc., are bothersome and hazardous because of their ability to assist in the transmission of certain diseases. Accordingly, any easy method for combating house flies around animals is highly desirable. One of the most effective methods for controlling insects around barnyards is to treat manure piles or animal droppings which appear to be the primary attractant for the flies.

It is, therefore, an object of this invention to provide an animal feed composition containing an edible insecticide which is nontoxic to animals ingesting said feed.

Another object of the invention is the provision of an animal feed composition containing an insect pathogen which is unaffected by the animal body processes and which provides an insect toxicant in those areas frequented by animals which have ingested said feed.

Still another object of the invention is the provision of a method for preparing a unique animal feed material which is protected against infestation by insects which normally contaminate such feeds.

Additional objects, if not specifically set forth herein, will be readily apparent to those skilled in the art from the detailed description of the invention which follows.

Generally, the invention comprises animal feed compositions containing biological insect pathogens and also a method utilizing these feed compositions to control insect population in areas frequented by domestic animals said areas including barnyards, poultry pens, kennels, etc. The feed composition comprises nutrient material for the animal and an insecticidal amount of the fermentation liquor obtained from the sporulation and proliferation of *Bacillus thuringiensis* Berliner microorganisms.

More specifically, the animal feeds provided by the invention contain, in addition to nutrients for the animal, a small amount of *Bacillus thuringiensis* Berliner spores and sporulation by-products. The insecticidal agent is edible inasmuch as it is nontoxic to warmblooded animals in the amount required for adequate insect control. Only a small amount of the composition comprising the spores and sporulation by-products need be embodied in the animal feed to provide a nutritious feed composition protected against insect infestation. The insecticidal material can be incorporated in the feed and uniformly distributed throughout the feed by any one of several methods. By "fermentation liquor" or "fermentation mash" as used hereinafter is meant the nutrient medium remaining following the fermentation procedure. This medium comprises the *Bacillus thuringiensis* Berliner cells, both vegetative and spore, metabolic products inherent in growth and/or sporulation, and unused components of the original medium. The solids content of the liquor comprises about 1% by weight, and these solids can be isolated by vacuum evaporation or other drying techniques. It is possible to prepare a solid product containing any desired amount of water by drying to a predetermined moisture level. The fermentation liquor in which the spores are proliferated can be admixed to the feed directly or the ferment can first be concentrated to provide a more concentrated insecticidal material. The type of feed treated can be any of that class of feeds generally characterized as dry feed, such as those containing leguminous plants and seeds and the grain-producing grasses and cereals. Wet feds, including canned pet foods, can also be treated with the spore-containing product.

*Bacillus thuringiensis* Berliner spores have previously been employed in controlling certain insects such as chewing insects which infest growing lettuce, alfalfa, spinach, potatotes, etc. While the insecticidal agent which is employed in the compositions of this invention contain *Bacillus thuringiensis* Berliner spores, the biological insecticidal composition is prepared by an improved method and the composition is also improved. The products and the methods for preparing these products are disclosed in copending application S.N. 65,921, filed October 31, 1960, now U.S. Patent Number 3,150,062. Although these improved compositions are characterized by a relatively low spore count in comparison with prior known *Bacillus thuringiensis* Berliner spore insecticides produced for field control of leaf chewing insects, they also provide a highly potent anti fly maggot activity. While the treatment of growing crops with these compositions represents a substantial advance in insect control, the use of the insecticides in animal feeds, specifically balanced feed rations containing vegetable products, provides an additional and important advance in animal feed production. The insecticide can also be employed effectively in meat containing foods such as pet foods.

Only a small insecticidally effective amount of a spore-containing composition need be present in the feed to obtain adequate insect control. About 0.1% of the fermentation solids obtained from sporulation of *Bacillus thuringiensis* Berliner spores based on the total weight of the feed provides some protectiion against infestation. Usually about 0.01 to 5% of the solids based on the weight of the feed is used. While larger amounts of the insecticidal agent can be employed without adversely affecting the feed or the animal consuming the feed, the increase in insect control provided by these larger amounts is not commensurate with the increase in cost of the product. A significant decrease in the fly population in areas frequented by animals ingesting the feeds of this invention has been noted with feeds that contain around 2% weight of *Bacillus thuringiensis* Berliner fermentation liquor.

The insecticidal material can be added to the feed in the form of a dry concentrate of the insecticidal agent on an inert carrier or one of the components of the total feed ration can serve as the carrier for the insecticidal agent. in the copending patent application referred to previously a method for preparing microbial insect compositions deposited on a carrier such as clay, talc, bentonite, etc., is described. Similarly, soybean hulls, peanut shells, sawdust, etc., may be used as a substitute for the clay, talc or other inorganic carrier. Although any of these compositions including a carrier having *Bacillus thuringiensis* Berliner spores and sporulation products deposited thereon may be employed as the insecticidal agent of the present invention, it is also very desirable to employ one of the components of the feed ration such as ground corn, soybean meal, etc. as the carrier for the insecticide. The following example illustrates one embodiment of the invention.

EXAMPLE I

A medium formulation for proliferation of the spores is as follows:

Component A:
  Cerelose _____ gm__ 5
  Corn steep liquor _____ gm__ 4
  Ammonium sulfate _____ gm__ 4
  Sodium hydroxide _____ gm__ 0.2
  Water _____ ml__ 900

Component B:
  $K_2HPO_4$ _____ gm__ 1
  $MnSO_4 \cdot H_2O$ _____ mg__ 150
  $MgSO_4 \cdot 7H_2O$ _____ gm__ 1
  $ZnSO_4$ _____ mg__ 1
  $CuSO_4$ _____ mg__ 1
  $CaCl_2$ _____ mg__ 1
  $FeSO^4$ _____ mg__ 1
  Water _____ ml__ 100

Each of the components A and B is autoclaved at 15 lbs. for 15 minutes and the 2 components are aseptically combined. The medium is inoculated with a loopful of *Bacillus thuringiensis* Berliner spores and the spores are proliferated in the medium for 18–24 hours at 90–95° F., with aeration and agitation. This material can then be used to inoculate a larger batch at a ratio of about 1 to 100 if desired. At the end of this time, 200 parts of the fermentation liquor, including the spores, vegetative cells, and the liquid, is mixed with 100 parts of pulverized soybean hulls. The mixture is dried by evaporation and the dried product is milled to reduce the lumps and the dried soybean hull material is employed as a component in animal feed compositions. This soybean hull material has been employed in animal feeds at a level of about 2.5% based on the weight of the feed.

A corn meal ration was prepared by incorporating in corn meal *Bacillus thuringiensis* Berliner fermentation liquor (41.2% wet weight) and the corn meal containing the insecticidal agent was employed in a feed containing 56.85% corn meal. The corn meal ration containing the insecticidal agent was employed in feeding tests on rats and chickens. Table I which follows shows the insect control obtained in these tests.

EXAMPLE II

The base feed contained the following ingredients:

| Component: | Pounds, per 100 lb. |
|---|---|
| Ground yellow corn | 57 |
| Soybean oil meal (50%) | 17.5 |
| Meat and bone scraps (50%) | 5 |
| Fish meal (60%) | 1 |
| Corn gluten meal | 5 |
| Dehydrated alfalfa meal (18%) | 2.5 |
| Corn fermentation solubles conc. | 1.0 |
| Poultry by-product meal | 2.5 |
| Hydrolyzed poultry feathers | 1.0 |
| Defluorinated rock phosphate | 0.75 |
| Ground limestone | 0.75 |

A mineral and vitamin supplement was also incorporated in this feed ration. The corn meal ration described above was fed to chickens and rats and the insecticidal activity of the animal excreta was compared to that obtained from a control animal which was fed the corn meal feed material having no insecticidal agent added thereto. Table I shows the results obtained.

*Table I*

| Animal Ingesting Feed | Days Feeding | Percent Mortality of Larvae | |
|---|---|---|---|
| | | Control | Test Animals |
| Chicken | 0–4 | 4 | 100 |
| | 4–7 | 2 | 100 |
| | 7–10 | 6 | 94 |
| Rats | 0–6 | 28 | 100 |
| | 7–12 | 28 | 100 |
| | 12–15 | 32 | 100 |

Tests on larger animals include calf and hog feeding tests. In each case the *Bacillus thuringiensis* Berliner fermentation mash was incorporated in the ration fed to the animals.

The calf feed was prepared by dehydrating 28 lbs. of *Bacillus thuringiensis* Berliner fermentation mash to 1,855 grams or approximately 2% of the original mass. 1,060 grams of this concentrate was mixed with 2½ lbs. of soybean meal and the mixture was then blended to 40 lbs. of calf feed consisting of 60% milo, 25% hay, 20% molasses, and 5% cottonseed meal. This ration was fed to one calf while a control calf was fed the same feed without the *Bacillus thuringiensis* Berliner mash. Droppings were collected each day from each animal and these droppings were utilized as a substrate for a development of 1-day old fly larvae. The following table shows the percentage of emergent adults from each test in a 10-day period.

*Table II*

| Day on Which Calf Feces were collected | Fly Larvae Mortality, Percent | |
|---|---|---|
| | Control | Test |
| 0 | 10 | 10 |
| 1 | | 62 |
| 2 | | 34 |
| 3 | 6 | 16 |
| 4 | | 76 |
| Stopped Feeding | | |
| 5 | | 34 |

A hog feed was prepared by mixing 795 grams of 2% *Bacillus thuringiensis* Berliner concentrate with 30 lbs. of ground corn. This feed was given to the test hog while the control animal was fed ground corn containing no concentrate. The following shows the percentage of emergent adult flies present in the test system as prepared in the example with calf tests.

*Table III*

| Day on which Hog Feces were collected | Fly Larvae Mortality, Percent | |
|---|---|---|
| | Control | Test |
| 0 | 10 | 10 |
| 1 | | 34 |
| 2 | | 46 |
| 3 | 18 | 52 |
| 4 | | 76 |
| Stopped Feeding | | |
| 5 | | 44 |

It is apparent that the compositions of this invention provide a highly desirable feed material for farmers, cattlemen, poultry raisers, pet food manufactures, etc. Also, the insecticidal agent is very valuable for incorporation into pet foods, many of which are canned and subjected to elevated temperatures during the canning operation, since these elevated temperatures do not adversely affect the insecticidal activity of the insect controlling agent.

Resistance to degradation or diminution of insecticidal activity as a result of exposure of the insecticidal material to heat is demonstrated in the following test.

The *Bacillus thuringiensis* Berliner solids were divided into several portions and each portion was placed in water and the water suspension heated. After heating each sample for the time indicated these materials were substituted for the water portion of a conventional fly feed. The fly feed was placed in a jar and fifty 1-day-old maggots were introduced into each jar. After ten days at room temperature the number of adults was recorded. No pupa or viable larvae were present at that time. Table IV shows the results obtained.

*Table IV*

Temperature and exposure time:  Fly larvae mortality, percent

| | |
|---|---|
| 70° F. for 2 hrs. | 94 |
| 210° F. for 2 hrs. | 94 |
| 210° F. for 4 hrs. | 100 |
| 210° F. for 6 hrs. | 98 |
| 210° F. for 7¾ hrs. | 98 |
| Control (water only) | 7½ |

Obviously many modifications and variations of the invention as hereinbefore set forth may be made without departing from the spirit and scope thereof, and therefore, only those limitations should be imposed as are indicated in the appended claims.

We claim:

1. A process for preparing an animal feed composition which is protected against insect infestation and contains an insect pathogen which is unaffected by the animal body processes comprising: embodying in a balanced feed ration a small amount of the fermentation liquor obtained from the sporulation and proliferation of *Bacillus thuringiensis* Berliner microorganisms.

2. A process for preparing an insect-restraint animal feed composition which comprises: embodying in one of the components of a balanced feed ration a small amount of the solids obtained by drying fermentation mash from a *Bacillus thuringiensis* Berliner fermentation and incorporating said component in a complete animal feed.

3. A method for distributing an insecticidal composition around areas frequented by livestock and poultry comprising: feeding said livestock and poultry a composition containing a small amount of the fermentation liquor obtained from the sporulation and proliferation of *Bacillus thuringiensis* Berliner microorganism whereby to render the excreta of said animal's digestive system toxic to insects.

References Cited by the Examiner

UNITED STATES PATENTS

| | | | |
|---|---|---|---|
| 2,818,340 | 12/1957 | Goddin | 99—2 |
| 2,904,435 | 9/1959 | Kruse | 99—2 |
| 3,086,922 | 4/1963 | Mechalas | 195—96 |
| 3,150,062 | 9/1964 | Greenberg et al. | 195—96 |

OTHER REFERENCES

Chem. & Eng. News, Dec. 22, 1958, p. 15.

Quisenberry et al., Feedstuffs, October 18, 1958, pages 60 and 62.

Science News Letter, April 18, 1959, page 245.

A. LOUIS MONACELL, *Examiner.*

A. H. WINKELSTEIN, D. J. DONOVAN,
*Assistant Examiners.*

UNITED STATES PATENT OFFICE
CERTIFICATE OF CORRECTION

Patent No. 3,285,748            November 15, 1966

Carl H. Koonz et al.

It is hereby certified that error appears in the above numbered patent requiring correction and that the said Letters Patent should read as corrected below.

Column 1, line 22, for "formers" read -- farmers --; column 2, line 49, for "protectiion" read -- protection --; line 64, for "in" read -- In --; column 3, line 23, "$CuSO_4$" should be indented; line 25, for "FeSO4" read -- $FeSO_4$ --; line 29, for "aspetically" read -- aseptically --; column 6, line 1, for "insect-restraint" read -- insect-resistant --.

Signed and sealed this 2nd day of January 1968.

(SEAL)
Attest:

Edward M. Fletcher, Jr.            EDWARD J. BRENNER
Attesting Officer            Commissioner of Patents